(12) United States Patent
Zheng et al.

(10) Patent No.: US 9,528,384 B2
(45) Date of Patent: Dec. 27, 2016

(54) BRUSH SEAL

(75) Inventors: Xiaoqing Zheng, Niskayuna, NY (US); Bernard Arthur Couture, Jr., Guilderland, NY (US); Michael John Bowman, Niskayuna, NY (US); William Edward Adis, Scotia, NY (US); Michael Dennis Mack, Ballston Spa, NY (US); Kim James Clark, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 82 days.

(21) Appl. No.: 13/169,343

(22) Filed: Jun. 27, 2011

(65) Prior Publication Data

US 2012/0326392 A1 Dec. 27, 2012

(51) Int. Cl.
*F01D 11/02* (2006.01)
*F01D 11/12* (2006.01)
*F01D 11/00* (2006.01)
*F16J 15/32* (2016.01)

(52) U.S. Cl.
CPC ............ *F01D 11/127* (2013.01); *F01D 11/001* (2013.01); *F16J 15/3288* (2013.01); *F05D 2220/31* (2013.01); *F05D 2220/32* (2013.01); *F05D 2240/56* (2013.01); *Y02T 50/672* (2013.01)

(58) Field of Classification Search
USPC ..... 277/355; 415/170.1, 171.1, 173.1, 173.3, 415/173.6, 174.2
See application file for complete search history.

(56) References Cited

U.S. PATENT DOCUMENTS

| | | | |
|---|---|---|---|
| 5,106,104 A * | 4/1992 | Atkinson et al. ............. | 277/303 |
| 5,201,530 A | 4/1993 | Kelch et al. | |
| 5,335,920 A | 8/1994 | Tseng et al. | |
| 5,480,165 A * | 1/1996 | Flower .......................... | 277/355 |
| 5,630,590 A | 5/1997 | Bouchard et al. | |
| 5,961,125 A * | 10/1999 | Wolfe et al. .................. | 277/355 |
| 5,961,279 A * | 10/1999 | Ingistov ..................... | 415/170.1 |
| 6,077,038 A * | 6/2000 | Gail et al. ..................... | 415/229 |
| 6,131,910 A * | 10/2000 | Bagepalli et al. ............. | 277/355 |
| 6,173,962 B1 * | 1/2001 | Morrison et al. ............. | 277/355 |
| 6,231,047 B1 * | 5/2001 | Cunningham et al. ....... | 277/355 |
| 6,308,957 B1 * | 10/2001 | Wright .......................... | 277/355 |
| 6,457,719 B1 * | 10/2002 | Fellenstein et al. .......... | 277/355 |
| 6,460,857 B1 | 10/2002 | Turnquist et al. | |
| 6,464,230 B1 * | 10/2002 | Tong et al. .................... | 277/355 |
| 6,648,334 B2 * | 11/2003 | Inoue ............................ | 277/355 |
| 6,739,592 B2 * | 5/2004 | Kono ............................. | 277/355 |
| 7,445,212 B2 * | 11/2008 | Gail et al. ..................... | 277/355 |
| 7,516,962 B2 * | 4/2009 | Boeck ........................... | 277/355 |

(Continued)

*Primary Examiner* — Kristina Fulton
*Assistant Examiner* — Eugene G Byrd
(74) *Attorney, Agent, or Firm* — James W. Pemrick; Ernest G. Cusick; Frank A. Landgraff (57) ABSTRACT

A brush seal is provided having a brush housing having a back plate and a front plate, a first layer of bristles disposed adjacent to the back plate, where at least one of the first layer of bristles has a first diameter. A second layer of bristles are disposed adjacent to the first layer of bristles, and at least one of the second layer of bristles has a second diameter. A third layer of bristles are disposed adjacent to the second layer of bristles, and at least one of the third layer of bristles has a third diameter. The first diameter and the third diameter are larger than the second diameter.

28 Claims, 6 Drawing Sheets

(56) References Cited

U.S. PATENT DOCUMENTS

| | | |
|---|---|---|
| 7,559,554 B2 | 7/2009 | Hogg et al. |
| 7,854,584 B2 * | 12/2010 | Lusted et al. ............... 415/111 |
| 8,028,996 B2 * | 10/2011 | Ruggiero et al. ............ 277/355 |
| 8,075,254 B2 * | 12/2011 | Morgan et al. ............ 415/170.1 |
| 2010/0068042 A1 * | 3/2010 | Bruck et al. ............... 415/174.2 |
| 2010/0201073 A1 * | 8/2010 | Adis et al. .................. 277/355 |
| 2010/0270747 A1 * | 10/2010 | Ghasripoor et al. ......... 277/355 |

* cited by examiner

BRUSH SEAL

BACKGROUND OF THE INVENTION

The invention relates generally to restricting the flow of a fluid between two pressurized chambers and more specifically to a brush seal for restricting a flow of fluid between pressurized chambers of a turbomachine.

Turbomachines, such as gas turbines and steam turbines, employ bladed rotors in a turbine section to convert thermodynamic energy from the fluids such as pressurized steam, compressed air and combustion gases into mechanical energy for rotating one or more centrally mounted shafts. The shafts, in turn, provide power to aircraft, heavy equipment, waterborne vehicles and electrical power generators. The interfaces between adjacent engine components in turbomachines are sealed in various ways to restrict leakage of fluids such as the pressurized steam, compressor air and combustion gases. There are many interfaces between rotating and stationary components in such turbomachines. Sealing these interfaces presents challenges due to the excessive fluid temperatures and pressures, combined with relative axial and/or radial movement between the engine components. Generally, sealing of these interfaces is done using various types of seals like labyrinth seals and honeycomb seals.

A brush seal is an advanced seal that provides an alternative to labyrinth or honeycomb seals. The brush seal is comprised of thousands of densely packed wire filaments (bristles) secured between two metallic plates. Bristles with a flexible end bridge a gap between adjacent components and any relative movement is absorbed through deflection of the bristles. Brush seals are very effective because they have minimum effective clearance during normal operation. The tortuous path through the bristles achieves the restriction effect even as the gap distance changes. Brush seals offer many advantages when compared with traditional seals. Unlike the labyrinth seal, a brush seal is designed to come in contact with a rotor to provide a positive seal.

Brush seal bristles are also susceptible to deflection due to fluid pressure loading. For this reason, back plates support the bristles along a majority of their length. The bristles are loaded against the back plate by the fluid pressure, thus preventing permanent deflection.

However, previous fleet experience shows that bristle deflections eventually yield the bristle ends, reducing their sealing effectiveness and rendering them unacceptable for continued service. Reduced brush seal effectiveness will increase fluid leakage, fuel usage and, consequently, increase operating costs until the brush seal is replaced. Removal and disassembly of a turbomachine for brush seal replacement is both costly and time consuming.

BRIEF DESCRIPTION OF THE INVENTION

According to a first aspect of the present invention, a seal is provided having a housing with a back plate and a front plate, a first layer of bristles disposed adjacent to the back plate, where at least one of the first layer of bristles has a first diameter. A second layer of bristles are disposed adjacent to the first layer of bristles, and at least one of the second layer of bristles has a second diameter. A third layer of bristles are disposed adjacent to the second layer of bristles, and at least one of the third layer of bristles has a third diameter. The first diameter and the third diameter are larger than the second diameter.

According to a second aspect of the present invention, a seal is provided having a housing with a back plate and a front plate, a first layer of bristles disposed adjacent to the back plate, where at least one of the first layer of bristles has a first stiffness. A second layer of bristles are disposed adjacent to the first layer of bristles, and at least one of the second layer of bristles has a second stiffness. A third layer of bristles are disposed adjacent to the second layer of bristles, and at least one of the third layer of bristles has a third stiffness. The first stiffness and the third stiffness are greater than the second stiffness.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

It should be understood that part numbers assigned to parts in one drawing may be assigned to corresponding parts in succeeding drawings.

DETAILED DESCRIPTION OF THE INVENTION

Figure 1:
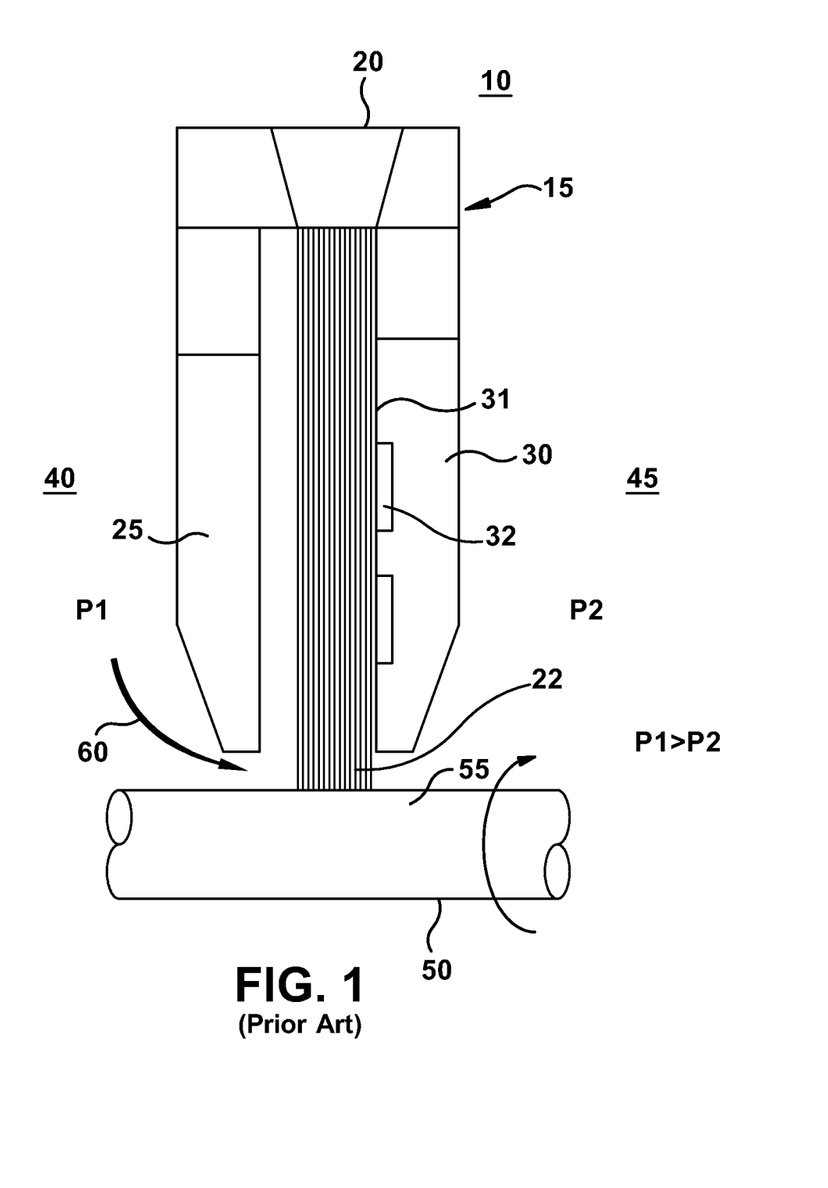
FIG. 1 illustrates a prior art brush seal seated on a back plate for sealing a shaft from a leakage flow due to a forward differential pressure.

FIG. 1 illustrates a radial side sectional view of a prior art brush seal 10 for sealing a rotating shaft. The brush seal 10 includes a housing 15 for mounting a brush holder 20. The housing includes a front plate 25 and a back plate 30 for seating brush seal bristles 22. The back plate 30 may include pressure balance features such as circumferential grooves 32 to reduce friction from contacting force. The bristles 22 are of uniform size and are seated against the back plate 30 when a higher pressure P1 is present in a first chamber 40 on one axial side of the brush seal 10 relative to the pressure P2 in a second chamber 45 on the second axial side of the brush seal. The housing is positioned to support the bristles in proximity to movable shaft 50. The brush seal bristles 22 are attached to the holder 20, and the free ends are disposed near surface 55 of the movable shaft 50 to reduce the leakage flow 60 created by this pressure differential.

Experience shows that bristle deflections eventually yield the bristle ends under high pressure loading, reducing their sealing effectiveness and rendering them unacceptable for continued service. In the past, bristles have been formed of uniform size and diameter, and flow disturbances have caused fluttering of the bristles, especially the front most (i.e., upstream) or forward located bristles, that leads to rapid wear. In addition, the rear rows of the bristle pack can suffer breakage or permanent deformation from high bending stress. Because of the compressible nature of air or steam flow, the rear rows (downstream side) are subject to a disproportionally large pressure drop. In most cases, it is the bristle bending stress that sets the pressure limit for brush seal applications. Reduced brush seal effectiveness, caused by unwanted deformation and bristle breakage, will increase fluid leakage, fuel usage and, consequently, increase operating costs until the brush seal is replaced. Removal and disassembly of a turbomachine for brush seal replacement is both costly and time consuming.

Some prior brush seals have employed thinner bristles in the front rows, which make the fluttering wear even worse because thinner bristles are less stable and more susceptible to incoming flow disturbance. Field experience has shown that these brush seals are consistently worn in a tapered pattern from the front row in gas turbines and steam turbines. Reducing wear of front rows in brush seals is a long felt yet unresolved need to sustain brush seal performance. According to one aspect of the present invention, a goal is to reduce wear of the front rows and reduce the bending stress of the rear rows while maintaining good flexibility of the brush seal. Accordingly, an aspect of the present invention uses thick wires for the front rows and rear rows, and thinner wires between the front and rear rows. A result is that a brush seal can withstand higher pressure loading and incoming flow disturbance, as the thin wires in the middle provide tight sealing capability and maintain the flexibility of the seal.

Figure 2:
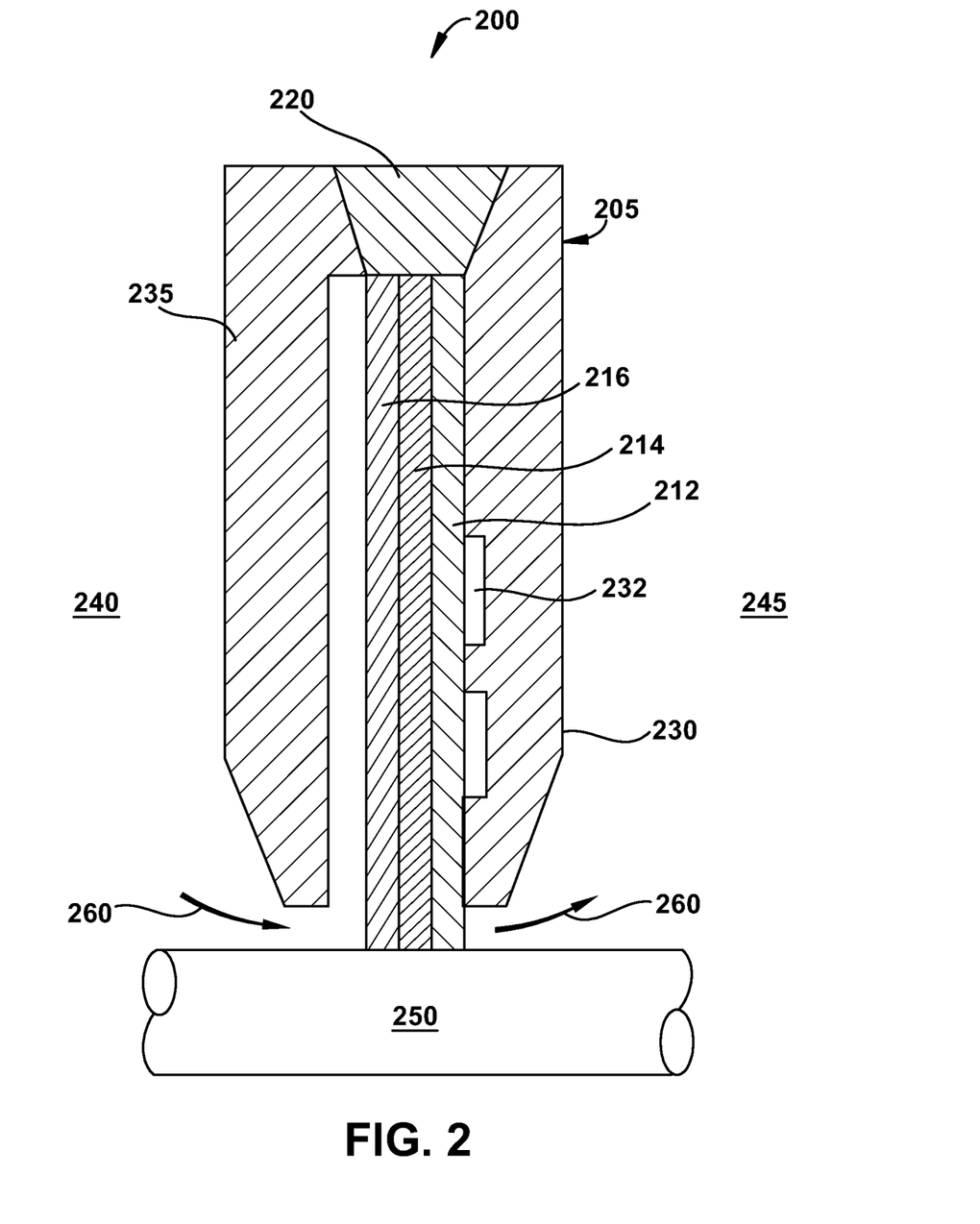
FIG. 2 illustrates a radial side sectional view of a brush seal, according to an aspect of the present invention.

The following aspects of the present invention have many advantages, including providing a brush seal having improved sealing capability and durability. FIG. 2 illustrates a radial side sectional view of a brush seal 200 for sealing a rotating shaft 250, according to an aspect of the present invention. The brush seal 200 includes a housing 205 for mounting a brush holder 220 that may hold the bristles 212, 214, 216 through welding, brazing, epoxying or mechanical means. The housing includes a front plate 235 and a back plate 230 for seating brush seal bristles 212, 214, 216. The back plate may be made with pressure balance features such circumferential grooves 232 to reduce friction from contacting forces. The bristles are arranged in multiple layers/groups and these layers/groups have bristles of different size and/or stiffness compared to other bristle layers. The size can pertain to the diameter, cross-sectional area and/or stiffness of each bristle in the respective layers or groups.

The first layer of bristles 212 are disposed adjacent to the back plate 230, and each of the first layer of bristles 212 has a first diameter and/or first stiffness. The second layer of bristles 214 are disposed adjacent to the first layer of bristles 212, and each of the second layer of bristles 214 has a second diameter and/or second stiffness. The third layer of bristles 216 are disposed adjacent to the second layer of bristles 214, and each of the third layer of bristles 216 has a third diameter and/or third stiffness. The first layer of bristles 212 have the thickest and/or stiffest bristles to withstand the loading of the high pressure flow. The third layer of bristles 216 have medium bristles to endure disturbances in the incoming flow 260, The second layer of bristles 214, which are sandwiched between the first 212 and third 216 layers, are fine bristles and/or have the lowest stiffness to obtain good sealing characteristics between the first chamber 240 and the second chamber 245, as well as to maintain flexibility.

In some applications it may be desirable to configure the brush seal so that the first diameter is larger than the second diameter, and the third diameter is larger than the second diameter. In other applications the first diameter could be larger than the third diameter. In addition, it may be desirable to configure the brush seal so that the first stiffness is greater than the second stiffness, and the third stiffness is greater than the second stiffness. In other applications the first stiffness could be greater than the third stiffness.

In one aspect of the present invention, the second layer can be comprised of bristles having the smallest diameter, the third layer can be comprised of bristles having a medium diameter, and the first layer can comprise bristles having the largest diameter. In another aspect, the second layer can be comprised of bristles having the lowest stiffness, the third layer can be comprised of bristles having a medium stiffness, and the first layer can comprise bristles having the greatest stiffness. In brush seals, the flexibility may commonly be characterized by an opposite term, stiffness. The bristle stiffness is defined by the force required to deflect the bristle in a radial direction by a predetermined unit distance. For a given bristle material, the larger the bristle diameter, generally the higher the bristle stiffness. However, if different materials are used in brush seals, soft material with larger diameter may have lower stiffness than stiff material with a smaller diameter.

Furthermore, the second layer may consist of sub-layers that have variable bristle diameters. However, in some applications it may be desirable that the bristle diameters in the second layer are sized so that they are more flexible than the first and third layers.

As one example only, the first layer of bristles 212 can include individual bristles having a diameter from about 0.006 inches to about 0.010 inches. The second layer of bristles 214 can include individual bristles having a diameter from about 0.002 inches to about 0.006 inches. The third layer of bristles 216 can include individual bristles having a diameter from about 0.004 inches to about 0.008 inches. However, any suitable bristle/wire diameter can be used as desired in the specific application.

Figure 3:
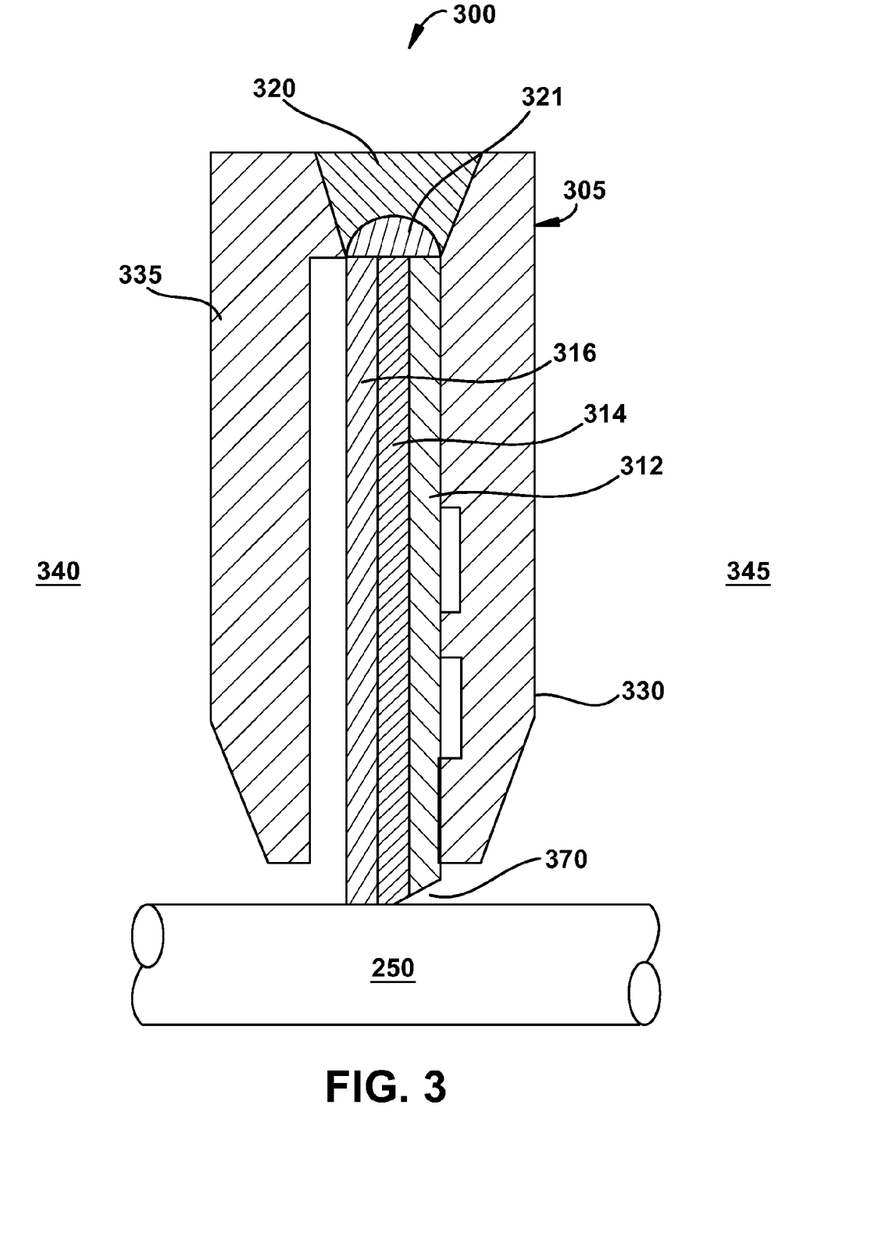
FIG. 3 illustrates a radial side sectional view of a brush seal, according to an aspect of the present invention.

FIG. 3 illustrates a radial side sectional view of a brush seal 300 for sealing a rotating shaft 250, according to an aspect of the present invention. The brush seal 300 includes a housing 305 for mounting a brush holder 320. The housing includes a front plate 335 and a back plate 330 for seating brush seal bristles 312, 314, 316. The bristles are arranged in multiple layers/groups and these layers/groups have bristles of different size and/or stiffness compared to the other bristle layers.

The first layer of bristles 312 are disposed adjacent to the back plate 330, and each of the first layer of bristles 312 has a first diameter and/or first stiffness. As one example only, the first layer of bristles 312 can include individual bristles having a diameter from about 0.006 inches to about 0.010 inches. The ends of the bristles can be cut to form a portion of tapered surface 370 near the bottom of the first layer of bristles. The second layer of bristles 314 are disposed adjacent to the first layer of bristles 312, and each of the second layer of bristles 314 has a second diameter and/or second stiffness. For example, the second layer of bristles 314 can include individual bristles having a diameter from about 0.002 inches to about 0.006 inches. The ends of the bristles can be cut to form a portion of tapered surface 370 near the bottom of the first layer of bristles. In layer 314 either all or only a portion of the bottom of the bristles in layer 314 can be cut to form a portion of tapered surface 370. The tapered surface 370 may help to reduce the impact of the thicker and/or stiffer bristles in layer 312 on heat generation and rotordynamics. The tapered surface 370 effectively forms a tapered gap between the ends of the bristles and the rotating shaft 250. As previously mentioned, the tapered surface 370 can be configured to extend over all bristle layers, or over portions of bristle layers.

The third layer of bristles 316 are disposed adjacent to the second layer of bristles 314, and each of the third layer of bristles 316 has a third diameter and/or third stiffness. For example, the third layer of bristles 316 can include individual bristles having a diameter from about 0.004 inches to about 0.008 inches. However, any suitable bristle/wire diameter can be used as desired in the specific application.

The first layer of bristles 312 have the thickest and/or stiffest bristles to withstand the loading of the high pressure flow. The third layer of bristles 316 have medium bristles to endure disturbances in the incoming flow, The second layer of bristles 314, which are sandwiched between the first 312 and third 316 layers, are fine bristles and/or have the lowest stiffness to obtain good sealing characteristics between the first chamber 340 and the second chamber 345, as well as to maintain flexibility.

The individual bristles may be formed of metallic or non-metallic wire. Metallic materials may include, copper, steel, metal alloys (which may include Haynes 25 and Hastelloy C-276) or any other suitable material as desired in the specific application. The metal alloys may include cobalt alloys or nickel alloys, and some non-limiting examples may be $Co^a_{51}Ni_{10}Cr_{20}W_{15}Fe_3{}^*Mn_{15}Si_{0.4}{}^*C_{0.10}$, where "a" refers to "as balance" and "*" refers to "maximum" and the numerals are in weight percent, or $Ni_{57}Co_{2.5}Cr_{16}Mo_{16}W_4Fe_5Si_{0.08}\ Mn_1C_{0.01}$, where the numerals are in weight percent. The cobalt and nickel alloys may also include Haynes® 25 alloy and Hastelloy® C-276 alloy (Haynes® and Hastelloy® are registered trademarks of Haynes International, Inc.). Non-metallic materials may include para-aramid synthetic fibers (e.g., Kevlar®, a registered trademark of E.I. du Pont de Nemours and Company), carbon fibers, or combinations thereof. Bristle materials and diameters are chosen depending on trade-off relationships among properties such as stiffness, creep resistance, wear resistance, and chemical inertness against oil, for example. Bristle diameters are chosen to ensure structural stability against aerodynamic forces applied thereupon by the working fluid while considering trade-off factors such as structural stability and desired compliance. For example, smaller diameters of metallic or non-metallic bristles result in lower effective clearance at the seal-rotary component interface and also lower stiffness resulting in lower heat generation.

Each bristle includes a first end coupled to the brush holder 320 and a second end disposed proximate to the rotating shaft 250. In certain aspects of the invention, all or a portion of the second or lower end of the bristles are configured to contact the rotating shaft 250. The brush holder 320 may also include a mounting device such as an epoxy material 321 disposed between the front plate 335, and the back plate 305. The epoxy material 321 is configured to couple non-metallic bristles to the brush holder 320. In other aspects, region 321 could be configured as a weld to bond the ends of metallic bristles. The front plate 335 and the back plate 305 may include a metallic material, or a composite material, or a combination thereof. The bristles may be clamped between the front plate 335 and the back plate 305. The first end of each bristle may be coupled to the epoxy/weld 321 and the second end protrudes towards the rotating shaft 250. In certain other aspects, the bristles may be heat welded to the front plate 335 and the back plate 305, or they could be secured to the front plate 335 and the back plate 305 using annular wires and retaining clamps (described hereinafter).

Figure 4:
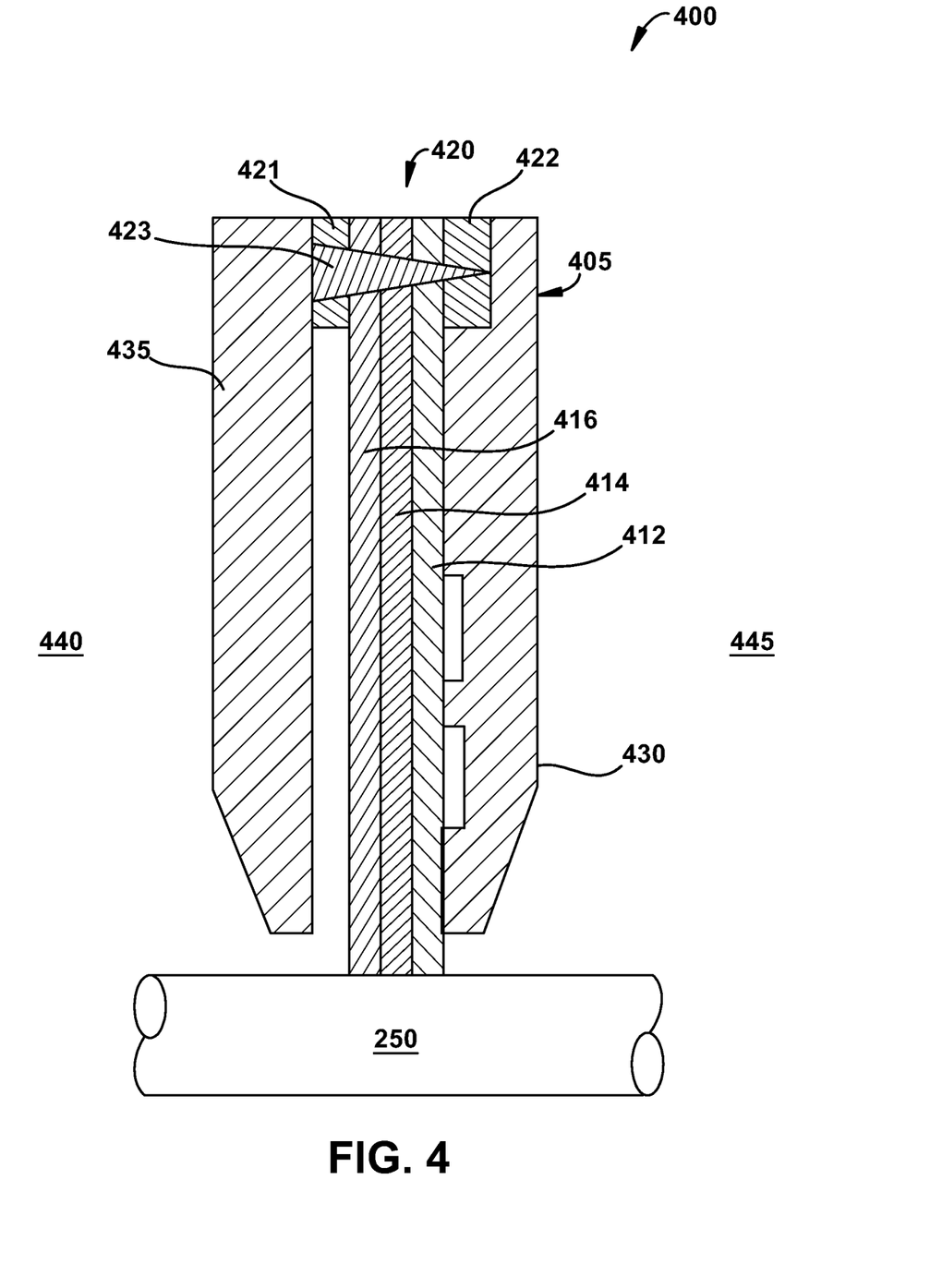
FIG. 4 illustrates a radial side sectional view of a brush seal, according to an aspect of the present invention.

FIG. 4 illustrates a radial side sectional view of a brush seal 400 for sealing a rotating shaft 250, according to an aspect of the present invention. The brush seal 400 includes a housing 405 for mounting a brush holder 420. The housing includes a front plate 435 and a back plate 430 for seating brush seal bristles 412, 414, 416. The bristles are arranged in multiple layers/groups and these layers/groups have bristles of different size and/or stiffness compared to the other bristle layers.

The first layer of bristles 412 are disposed adjacent to the back plate 430, and each of the first layer of bristles 412 has a first diameter and/or first stiffness. As one example only, the first layer of bristles 412 can include individual bristles having a diameter from about 0.006 inches to about 0.010 inches. The second layer of bristles 414 are disposed adjacent to the first layer of bristles 412, and each of the second layer of bristles 414 has a second diameter and/or second stiffness. For example, the second layer of bristles 414 can include individual bristles having a diameter from about 0.002 inches to about 0.006 inches. The third layer of bristles 416 are disposed adjacent to the second layer of bristles 414, and each of the third layer of bristles 416 has a third diameter and/or third stiffness. For example, the third layer of bristles 416 can include individual bristles having a diameter from about 0.004 inches to about 0.008 inches. However, any suitable bristle/wire diameter or stiffness can be used as desired in the specific application.

The first layer of bristles 412 may have the thickest and/or stiffest bristles to withstand the loading of the high pressure flow. The third layer of bristles 416 may have medium bristles to endure disturbances in the incoming flow. However, the first layer of bristles 412 and the third layer of bristles 416 may be substantially similar in diameter and/or stiffness. The second layer of bristles 414, which are sandwiched between the first 412 and third 416 layers, are finer bristles and/or have a lower stiffness to obtain good sealing characteristics between the first chamber 440 and the second chamber 445, as well as to maintain flexibility.

Each bristle includes a first end coupled to the brush holder 420 and a second end disposed proximate to the rotating shaft 250. In certain aspects of the invention, all or a portion of the second or lower end of the bristles are configured to contact the rotating shaft 250. The brush holder 420 may also include a mounting device such side rails 421 and 422, which may be attached to the front plate 435 and the back plate 430, respectively. An upper portion of the bristles (i.e., away from shaft 250 and near the top of the bristle pack) may be welded to each other and the side rails 421, 422 by weld 423. The weld 423 may be configured as shown in FIG. 4 or the weld may begin at the very top of the bristles and extend downward a suitable distance (not shown).

Figure 5:
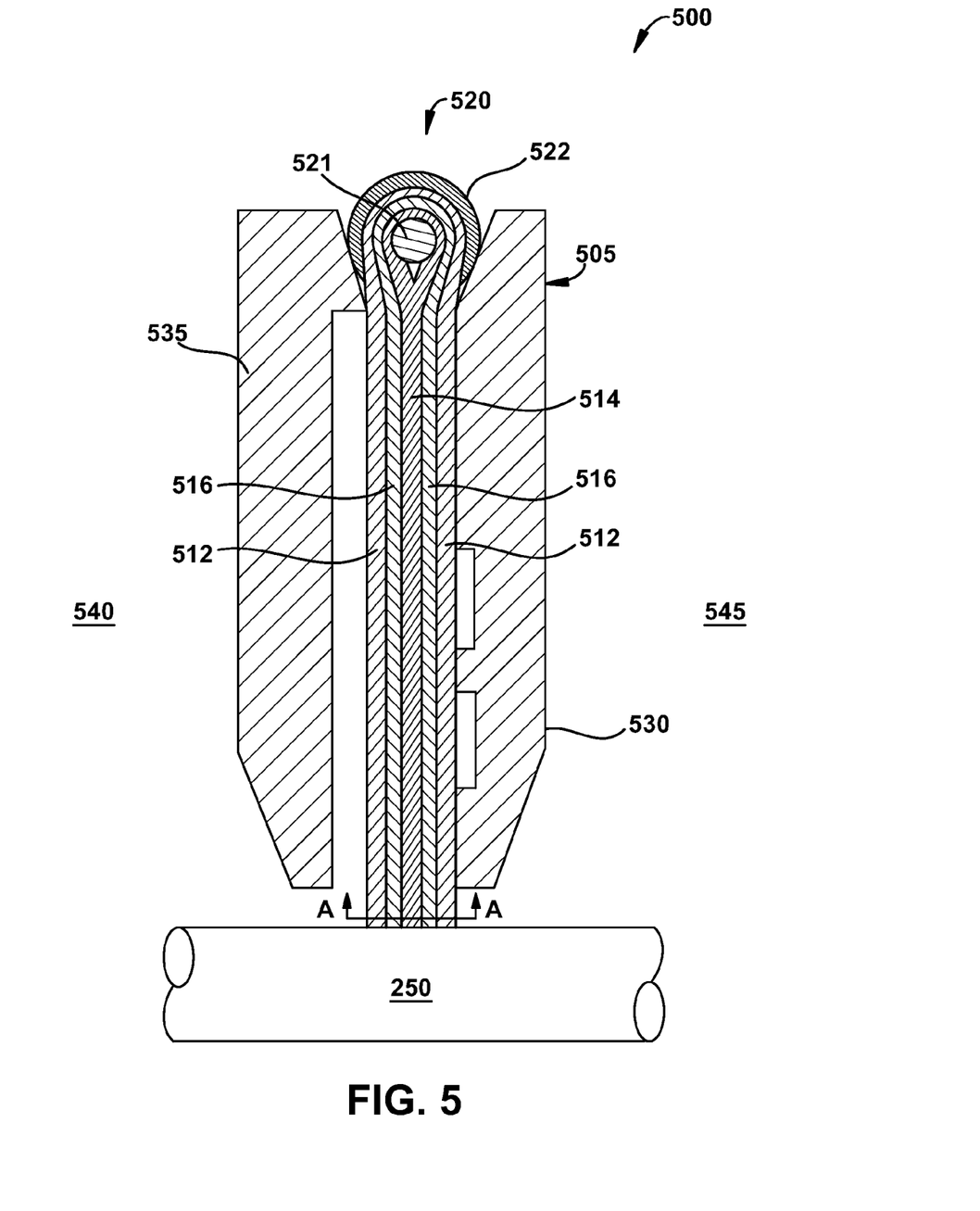
FIG. 5 illustrates a radial side sectional view of a brush seal, according to an aspect of the present invention.

FIG. 5 illustrates a radial side sectional view of a brush seal 500 for sealing a rotating shaft 250, according to an aspect of the present invention. The brush seal 500 includes a housing 505 for mounting a brush holder 520. The housing includes a front plate 535 and a back plate 530 for seating brush seal bristles 512, 514, 516. The bristles are arranged in multiple layers/groups and these layers/groups may have bristles of different size and/or stiffness compared to the other bristle layers.

The first layer of bristles 512 are disposed adjacent to the back plate 530, and each of the first layer of bristles 512 has a first diameter and/or first stiffness. As one example only, the first layer of bristles 512 can include individual bristles having a diameter from about 0.006 inches to about 0.010 inches. The second layer of bristles 514 are disposed adjacent to the first layer of bristles 512, and each of the second layer of bristles 514 has a second diameter and/or second stiffness. For example, the second layer of bristles 514 can include individual bristles having a diameter from about 0.002 inches to about 0.006 inches. The third layer of bristles 516 are disposed adjacent to the second layer of bristles 514, and each of the third layer of bristles 516 has a third diameter and/or third stiffness. For example, the third layer of bristles 516 can include individual bristles having a diameter from about 0.004 inches to about 0.008 inches. However, any suitable bristle/wire diameter or stiffness can be used as desired in the specific application.

The first layer of bristles 512 may have the thickest and/or stiffest bristles to withstand the loading of the high pressure flow. The third layer of bristles 516 may have medium bristles to endure disturbances in the incoming flow. However, the first layer of bristles 512 and the third layer of bristles 516 may be substantially similar or the same in diameter and/or stiffness. The second layer of bristles 514, which are sandwiched between the first 512 and third 516 layers, are finer bristles and/or have a lower stiffness (compared to the first and third layers of bristles) to obtain good sealing characteristics between the first chamber 540 and the second chamber 545, as well as to maintain flexibility.

The brush holder 520 may include an annular wire 521. The bristles 512, 514 and 516 are disposed around this annular wire 521 and are retained in place by the use of clamp 522. The clamp 522 applies a compressive force to hold the bristles securely in place. In this aspect of the invention, multiple substantially symmetrical bristle layers may be configured. For example, bristle layer 514 would reside at the center of the bristle pack, and bristle layer 516 would be located on both sides of bristle layer 514. Bristle layer 512 would be located on the outer portion of bristle layer 514. Effectively, a sandwich construction is formed resulting in a series of layers, and progressing from upstream to downstream (or left to right in FIG. 5), the bristle pack could be comprised of the following layers: 512, 516, 514, 516, 512.

Figure 6:
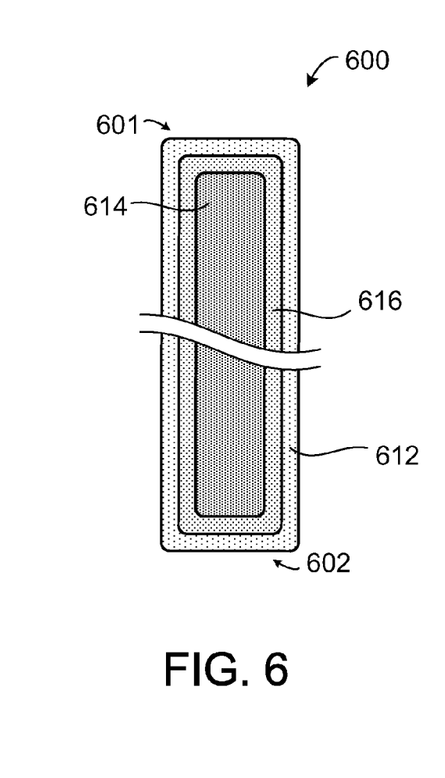
FIG. 6 illustrates an end view of a bristle pack along section line A-A in FIG. 5, according to an aspect of the present invention.

FIG. 6 illustrates an end view of the bristle pack 600 which may be along section line A-A in FIG. 5, according to an aspect of the present invention. Field experience has shown that bristles near the segment ends 601, 602, often are worn significantly more than bristles in the middle of the bristle pack. An aspect of the present invention provides an improved brush seal with a bristle pack 600 having thicker and/or stiffer bristles located at the segment ends 601, 602, and these thicker/stiffer bristles surround thinner and/or less stiff bristles at the center or middle of the bristle pack.

The bristles in bristle pack 600 are arranged in multiple layers or groups and these layers/groups may have bristles of different size and/or stiffness compared to the other bristle layers. For example, the first layer of bristles 612 are configured as the outer most bristles, and each of the first layer of bristles 612 has a first diameter and/or first stiffness. As one example only, the first layer of bristles 612 can include individual bristles having a diameter from about 0.006 inches to about 0.010 inches. A second layer of bristles 614 are disposed in the center or middle of the bristle pack 600, and each of the second layer of bristles 614 has a second diameter and/or second stiffness. For example, the second layer of bristles 614 can include individual bristles having a diameter from about 0.002 inches to about 0.006 inches. The third layer of bristles 616 are disposed between the first layer of bristles 612 and the second layer of bristles 614, and each of the third layer of bristles 616 may have a third diameter and/or third stiffness. For example, the third layer of bristles 616 can include individual bristles having a diameter from about 0.004 inches to about 0.008 inches. However, any suitable bristle/wire diameter or stiffness can be used as desired in the specific application.

The first layer of bristles 612 may have the thickest and/or stiffest bristles to withstand the loading of the high pressure flow. The third layer of bristles 616 may have medium bristles to endure disturbances in the incoming flow. However, the first layer of bristles 612 and the third layer of bristles 616 may be substantially similar or the same in diameter and/or stiffness. The second layer of bristles 614 are finer bristles and/or have a lower stiffness (compared to the first and third layers of bristles) to obtain good sealing characteristics and to maintain flexibility.

An advantage of this configuration is that the finer and/or less stiff bristles 614 are protected by the thicker and/or stiffer bristles 612, 616. Leakage flow or flow disturbances may cause greater wear to finer bristles that are exposed, and the finer/less stiff bristles provide better sealing, so it would be advantageous to protect these "more fragile" bristles. The thicker and/or stiffer bristles 612, 614 are more robust and are better at withstanding the flow and flow disturbances experienced during operation. However, these "more robust" bristles 612, 614 also provide less sealing than the second layer of bristles 614.

Figure 7:
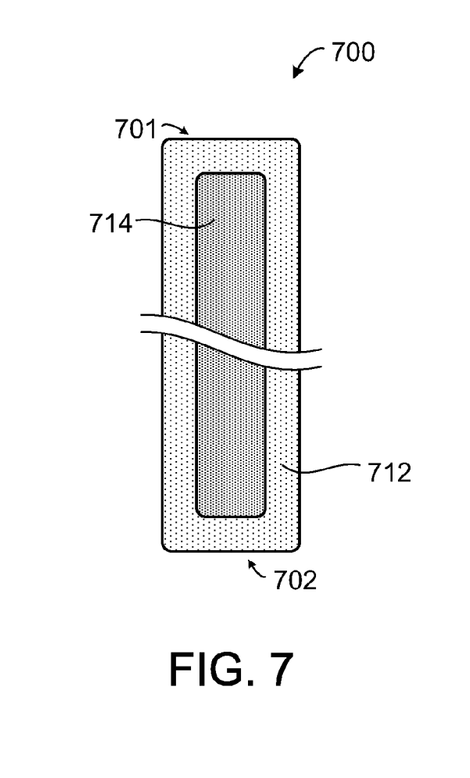
FIG. 7 illustrates an end view of a bristle pack, according to an aspect of the present invention.

FIG. 7 illustrates an end view of the bristle pack 700, according to an aspect of the present invention. An aspect of the present invention provides an improved brush seal with a bristle pack 700 having thicker and/or stiffer bristles located at the segment ends 701, 702, and these thicker/stiffer bristles surround thinner and/or less stiff bristles at the center or middle of the bristle pack.

The bristles in bristle pack 700 are arranged in multiple layers or groups and these layers/groups may have bristles of different size and/or stiffness compared to the other bristle layers. For example, the first layer of bristles 712 are configured as the outer most bristles, and each of the first layer of bristles 712 has a first diameter and/or first stiffness. A second layer of bristles 714 are disposed in the center or middle of the bristle pack 700, and each of the second layer of bristles 714 has a second diameter and/or second stiffness. The first layer of bristles 712 may have the thickest and/or stiffest bristles to withstand the loading of the high pressure flow. The second layer of bristles 714, which is substantially surrounded by the first layer of bristles 712, are finer bristles and/or have a lower stiffness (compared to the first layer of bristles 712) to obtain good sealing characteristics and to maintain flexibility. An advantage of this configuration is that the finer and/or less stiff bristles 714 are protected by the thicker and/or stiffer bristles 712.

Figure 8:
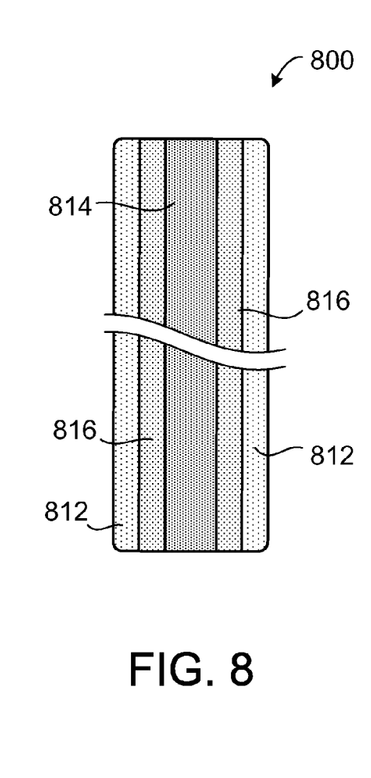
FIG. 8 illustrates an end view of a bristle pack, according to an aspect of the present invention.

FIG. 8 illustrates an end view of the bristle pack 800, according to an aspect of the present invention. The bristles in bristle pack 800 are arranged in multiple layers or groups and these layers/groups may have bristles of different size and/or stiffness compared to the other bristle layers. As one example only, this configuration could be used as a variation for the brush seal shown in FIG. 5. For example, the first layer of bristles 812 are configured as the outer most bristles, and each of the first layer of bristles 812 has a first diameter and/or first stiffness. As one non-limiting example, the first layer of bristles 812 can include individual bristles having a diameter from about 0.006 inches to about 0.010 inches. A second layer of bristles 814 are disposed in the center or middle of the bristle pack 800, and each of the second layer of bristles 814 has a second diameter and/or second stiffness. For example, the second layer of bristles 814 can include individual bristles having a diameter from about 0.002 inches to about 0.006 inches. The third layer of bristles 816 are disposed between the first layer of bristles 812 and the second layer of bristles 814, and each of the third layer of bristles 816 may have a third diameter and/or third stiffness. For example, the third layer of bristles 816 can include individual bristles having a diameter from about 0.004 inches to about 0.008 inches. However, any suitable bristle/wire diameter or stiffness can be used as desired in the specific application.

The first layer of bristles 812 may have the thickest and/or stiffest bristles to withstand the loading of the high pressure flow. The third layer of bristles 816 may have medium bristles to endure disturbances in the incoming flow. However, the first layer of bristles 812 and the third layer of bristles 816 may be substantially similar or the same in diameter and/or stiffness. The second layer of bristles 814, which are located substantially in the middle of the bristle pack 800, are finer bristles and/or have a lower stiffness (compared to the first and third layers of bristles) to obtain good sealing characteristics and to maintain flexibility. In this configuration, each layer of bristles extends substantially to the segment ends of the bristle pack.

In applications for brush seals on steam turbines, aspects of the present invention reduce shaft flow leakages during flow conditions and lower auxiliary steam requirements during transient loads like startups, shutdowns, trips, turning gear operations. This reduces overall steam turbine auxiliary steam requirement during startup, shutdowns, trips and turning gear operations, thereby reducing the auxiliary boiler cost for the operator.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A seal comprising:
   a housing having a back plate and a front plate;
   a first layer of bristles disposed adjacent to the back plate, at least one bristle of the first layer of bristles having a first diameter, the first layer of bristles configured to withstand loading of high pressure flow;
   a second layer of bristles disposed adjacent to the first layer of bristles, at least one bristle of the second layer of bristles having a second diameter, the second layer of bristles configured for sealing and flexibility;
   a third layer of bristles disposed adjacent to the second layer of bristles, at least one bristle of the third layer of bristles having a third diameter, the third layer of bristles configured to endure flow disturbances;
   wherein, the first diameter is larger than both the second diameter and the third diameter, and the third diameter is larger than the second diameter, and wherein a stiffness of the first layer of bristles is greater than a stiffness of the second layer of bristles, and a stiffness of the third layer of bristles is greater than a stiffness of the second layer of bristles, and wherein the second layer of bristles are protected by both the first layer of bristles and the third layer of bristles.

2. The seal according to claim 1, wherein a stiffness of the first layer of bristles is greater than a stiffness of the third layer of bristles.

3. The seal according to claim 1, wherein a diameter of individual bristles in the first layer of bristles is about 0.006 inches to about 0.010 inches, and a diameter of individual bristles in the second layer of bristles is about 0.002 inches to about 0.006 inches, and a diameter of individual bristles in the third layer of bristles is about 0.004 inches to about 0.008 inches.

4. The seal according to claim 1, further comprising:
   a tapered surface located near one end of the first layer of bristles;
   wherein the tapered surface is configured to reduce an impact of the first layer of bristles on a rotating shaft.

5. The seal according to claim 4, further comprising:
   the tapered surface located near one end and in at least a portion of the second layer of bristles;
   wherein the tapered surface is configured to reduce an impact of the second layer of bristles on the rotating shaft.

6. The seal according to claim 1, wherein the first layer of bristles, the second layer of bristles and the third layer of bristles comprise at least one, or combinations of: metallic material and non-metallic material.

7. The brush seal according to claim 6, wherein the metallic material comprises at least one or combinations of: copper, steel and metal alloys.

8. The seal according to claim 7, wherein the metal alloys comprise one or combinations of: cobalt alloys and nickel alloys.

9. The seal according to claim 6, wherein the non-metallic material comprises: para-aramid synthetic fibers, carbon fibers or combinations thereof.

10. The seal according to claim 1, wherein the first layer of bristles, the second layer of bristles and the third layer of bristles are mounted to the housing using at least one of: an epoxy material or a weld.

11. The seal according to claim 1, wherein the first layer of bristles, the second layer of bristles and the third layer of bristles are mounted to the housing with an annular wire and a clamp, wherein the first layer of bristles, the second layer of bristles and the third layer of bristles pass over the annular wire and are retained by the clamp.

12. A seal comprising:
   a housing having a back plate and a front plate;
   a first layer of bristles disposed adjacent to the back plate, at least one bristle of the first layer of bristles having a first stiffness, the first layer of bristles configured to withstand loading of high pressure flow;
   a second layer of bristles disposed adjacent to the first layer of bristles, at least one bristle of the second layer of bristles having a second stiffness, the second layer of bristles configured for sealing and flexibility;
   a third layer of bristles disposed adjacent to the second layer of bristles, at least one bristle of the third layer of bristles having a third stiffness, the third layer of bristles configured to endure flow disturbances;
   wherein, the first stiffness is greater than both the second stiffness and the third stiffness, and the third stiffness is greater than the second stiffness, and wherein the first layer of bristles and the third layer of bristles are configured to protect the second layer of bristles, and wherein the second layer of bristles are protected by both the first layer of bristles and the third layer of bristles, both the first layer of bristles and the third layer of bristles being more robust and providing less sealing than the second layer of bristles.

13. The seal according to claim 12, further comprising:
a tapered surface located near one end of the first layer of bristles;
wherein the tapered surface is configured to reduce an impact of the first layer of bristles on a rotating shaft.

14. The seal according to claim 13, further comprising:
the tapered surface located near one end and in at least a portion of the second layer of bristles;
wherein the tapered surface is configured to reduce an impact of the second layer of bristles on the rotating shaft.

15. The seal according to claim 12, wherein the first layer of bristles, the second layer of bristles and the third layer of bristles comprise at least one of: metallic material and non-metallic material, and wherein:
the metallic material comprises at least one of: copper, steel or metal alloys; and
the non-metallic material comprises: para-aramid synthetic fibers, carbon fibers or combinations thereof.

16. The seal according to claim 15, wherein the metal alloys comprise one or combinations of: cobalt alloys and nickel alloys.

17. The seal according to claim 12, wherein the first layer of bristles, the second layer of bristles and the third layer of bristles are mounted to the brush housing using at least one of:
an epoxy material;
a weld; and
an annular wire and a clamp, wherein the first layer of bristles, the second layer of bristles and the third layer of bristles pass over the annular wire and are retained by the clamp.

18. A seal comprising:
a housing having a back plate and a front plate;
a first layer of bristles disposed adjacent to the back plate, at least one bristle of the first layer of bristles having a first diameter, the first layer of bristles configured to withstand loading of high pressure flow;
a second layer of bristles disposed adjacent to the first layer of bristles, at least one bristle of the second layer of bristles having a second diameter, the second layer of bristles configured for sealing and flexibility;
a third layer of bristles disposed adjacent to the second layer of bristles, at least one bristle of the third layer of bristles having a third diameter, the third layer of bristles configured to endure flow disturbances;
wherein, the first diameter is larger than both the second diameter and the third diameter, and the third diameter is larger than the second diameter, and wherein a stiffness of the first layer of bristles is greater than a stiffness of the second layer of bristles and the third layer of bristles, and a stiffness of the third layer of bristles is greater than a stiffness of the second layer of bristles, and wherein the first layer of bristles and the third layer of bristles are configured to protect the second layer of bristles.

19. The seal according to claim 18, further comprising:
a tapered surface located near one end of the first layer of bristles, the tapered surface located near one end and in at least a portion of the second layer of bristles; and
wherein the tapered surface is configured to reduce an impact of the first layer of bristles on a rotating shaft.

20. The seal according to claim 19, wherein the first layer of bristles, the second layer of bristles and the third layer of bristles are mounted to the housing using at least one of:
an epoxy material or a weld; or
an annular wire and a clamp, and wherein the first layer of bristles, the second layer of bristles and the third layer of bristles pass over the annular wire and are retained by the clamp.

21. A seal configured for use with a turbomachine, the seal comprising:
a housing having a back plate and a front plate;
a first layer of bristles disposed adjacent to the back plate, a first diameter of individual bristles in the first layer of bristles is about 0.006 inches to about 0.010 inches, the first layer of bristles are configured to withstand loading of high pressure flow;
a second layer of bristles disposed adjacent to the first layer of bristles, a second diameter of individual bristles in the second layer of bristles is about 0.002 inches to about 0.006 inches, the second layer of bristles are configured for sealing and flexibility;
a third layer of bristles disposed adjacent to the second layer of bristles, a third diameter of individual bristles in the third layer of bristles is about 0.004 inches to about 0.008 inches, the third layer of bristles are configured to endure flow disturbances;
wherein, the first diameter and the third diameter are larger than the second diameter, a stiffness of the first layer of bristles and the third layer of bristles is greater than a stiffness of the second layer of bristles, and wherein the second layer of bristles is protected by both the first layer of bristles and the third layer of bristles, and wherein the first layer of bristles, the second layer of bristles and the third layer of bristles comprise one of or combinations of, cobalt alloys and nickel alloys.

22. The seal according to claim 21, wherein the first diameter is greater than the third diameter.

23. The seal according to claim 21, wherein a stiffness of the first layer of bristles is greater than a stiffness of the third layer of bristles.

24. The seal according to claim 21, further comprising:
a tapered surface located near one end of the first layer of bristles;
wherein the tapered surface is configured to reduce an impact of the first layer of bristles on a rotating shaft.

25. The seal according to claim 24, further comprising:
the tapered surface located near one end and in at least a portion of the second layer of bristles;
wherein the tapered surface is configured to reduce an impact of the second layer of bristles on the rotating shaft.

26. The seal according to claim 21, wherein the first layer of bristles, the second layer of bristles and the third layer of bristles are mounted to the housing using at least one of: an epoxy material or a weld.

27. The seal according to claim 21, wherein the first layer of bristles, the second layer of bristles and the third layer of bristles are mounted to the housing with an annular wire and a clamp, wherein the first layer of bristles, the second layer of bristles and the third layer of bristles pass over the annular wire and are retained by the clamp.

28. The seal according to claim 21, wherein the turbomachine is a steam turbine.

* * * * *

UNITED STATES PATENT AND TRADEMARK OFFICE
CERTIFICATE OF CORRECTION

PATENT NO. : 9,528,384 B2
APPLICATION NO. : 13/169343
DATED : December 27, 2016
INVENTOR(S) : Zheng et al.

It is certified that error appears in the above-identified patent and that said Letters Patent is hereby corrected as shown below:

In the Specification

In Column 5, Line 28, delete "*$Mn_{15}$" and insert -- *$Mn_{1.5}$ --, therefor.

In Column 5, Line 57, delete "back plate 305." and insert -- back plate 330. --, therefor.

In Column 5, Line 59, delete "region 321" and insert -- region --, therefor.

In Column 5, Line 61, delete "back plate 305" and insert -- back plate 330 --, therefor.

In Column 5, Lines 63-64, delete "back plate 305." and insert -- back plate 330. --, therefor.

In Column 5, Line 67, delete "back plate 305," and insert -- back plate 330, --, therefor.

In Column 6, Lines 1-2, delete "back plate 305" and insert -- back plate 330 --, therefor.

In the Claims

In Column 10, Line 26, in Claim 6, delete "least one," and insert -- least one --, therefor.

In Column 10, Line 28, in Claim 7, delete "brush seal" and insert -- seal --, therefor.

In Column 12, Line 36, in Claim 21, delete "of or" and insert -- or --, therefor.

Signed and Sealed this
Eleventh Day of April, 2017

Michelle K. Lee
*Director of the United States Patent and Trademark Office*